(12) United States Patent
Singh et al.

(10) Patent No.: US 12,157,590 B2
(45) Date of Patent: Dec. 3, 2024

(54) ROTARY SEALING APPARATUS FOR BLISTER PACKAGING MACHINES

(71) Applicants: SCITECH CENTRE, Maharashtra Mumbai (IN); ACG PAM PHARMA TECHNOLOGIES PVT. LTD., Mumbai (IN)

(72) Inventors: Karan Singh, Mumbai (IN); Sumit Waghmare, Mumbai (IN); Baban Dorge, Mumbai (IN); Satish Kite, Mumbai (IN); Amol Bokare, Mumbai (IN); Ajit Shinde, Mumbai (IN)

(73) Assignees: SCITECH CENTRE, Maharashtra Mumbai (IN); ACG PAM PHARMA TECHNOLOGIES PVT. LTD., Mumbai (IN)

( * ) Notice: Subject to any disclaimer, the term of this patent is extended or adjusted under 35 U.S.C. 154(b) by 147 days.

(21) Appl. No.: 18/004,431

(22) PCT Filed: Jun. 5, 2021

(86) PCT No.: PCT/IN2021/050547
§ 371 (c)(1),
(2) Date: Jan. 5, 2023

(87) PCT Pub. No.: WO2022/009216
PCT Pub. Date: Jan. 13, 2022

(65) Prior Publication Data
US 2023/0294862 A1    Sep. 21, 2023

(30) Foreign Application Priority Data

Jul. 6, 2020 (IN) .............................. 202021028696

(51) Int. Cl.
*B65B 51/16* (2006.01)
*B29C 65/00* (2006.01)
(Continued)

(52) U.S. Cl.
CPC ........ *B65B 51/16* (2013.01); *B29C 66/83413* (2013.01); *B29C 66/849* (2013.01);
(Continued)

(58) Field of Classification Search
None
See application file for complete search history.

(56) References Cited

U.S. PATENT DOCUMENTS 7,955,456 B2    6/2011    Fischer et al.

FOREIGN PATENT DOCUMENTS

EP    0257990 B1    3/1993

OTHER PUBLICATIONS

EP 1880943 machine translation (Year: 2008).*
(Continued)

*Primary Examiner* — Barbara J Musser
(74) *Attorney, Agent, or Firm* — CANTOR COLBURN LLP

(57) ABSTRACT

A rotary sealing apparatus for a blister packaging machine is disclosed. The rotary sealing apparatus includes a guide plate adapted to support a movement of a base foil having a plurality of blister pockets. The rotary sealing apparatus includes a counter sealing roller adapted to rotate to advance the base foil in a direction away from the guide plate and a sealing roller adapted to feed a seal foil between the counter sealing roller and the sealing roller. The counter sealing roller includes a plurality of cavities adapted to accommodate the plurality of blister pockets. The rotary sealing apparatus includes a cavity alignment unit disposed on the guide plate and adapted to align the plurality of blister pockets with the plurality of cavities. The cavity alignment unit is adapted to clamp the base foil on the guide plate to stretch the base foil to align the plurality of blister pockets with the plurality of cavities.

20 Claims, 8 Drawing Sheets

(51) Int. Cl.
*B29L 31/00* (2006.01)
*B65B 9/04* (2006.01)
*B65B 57/02* (2006.01)
*B65B 57/04* (2006.01)

(52) U.S. Cl.
CPC ............... *B65B 9/04* (2013.01); *B65B 57/02* (2013.01); *B65B 57/04* (2013.01); *B29L 2031/7164* (2013.01)

(56) References Cited

OTHER PUBLICATIONS

International Search Report; International Application No. PCT/IN2021/050547; International Filing Date—Jun. 5, 2021; Date of Mailing—Sep. 16, 2021; 3 pages.

Written Opinion of the International Searching Authority; International Application No. PCT/IN2021/050547; International Filing Date—Jun. 5, 2021; Date of Mailing—Sep. 16, 2021; 5 pages.

* cited by examiner

ROTARY SEALING APPARATUS FOR BLISTER PACKAGING MACHINES

CROSS REFERENCE TO RELATED APPLICATIONS

This application is a national stage application of PCT/IN2021/050547, filed Jun. 5, 2021, which claims priority to India application No. 202021028696, filed Jul. 6, 2020, and all the benefits accruing therefrom under 35 U.S.C. § 119, the content of which is incorporated by reference in its entirety.

FIELD OF THE INVENTION

The present disclosure relates to blister packaging machines and more particularly, to a rotary sealing apparatus having a cavity alignment unit for a blister packaging machine.

BACKGROUND

Generally, blister packaging machines are employed for packaging products, such as food products, small consumer goods, and pharmaceutical products, in various packaging industries. The blister packaging machines perform packaging operation by sealing a base foil having blister pockets for carrying the products with a sealing foil. The blister packaging machines usually include a lower roller and an upper roller to pinch the base foil with the sealing foil. The lower roller includes a plurality of cavities corresponding to the blister pockets formed on the base foil.

During the packaging operation, the plurality of cavities accommodates the blister pockets such that the base foil and the sealing foil are pressed together between the lower roller and the upper roller to seal the base foil. This ensures that the products in the blister pockets are not damaged when the base foil and the sealing foil are pressed together during the packaging operation. Therefore, it is essential to maintain alignment of the blister pockets with respect to the plurality of cavities of the lower roller to ensure that the blister pockets fall within the plurality of cavities during the packaging operation.

However, during the continuous operation of the blister packaging machine, the blister pockets may be misaligned with respect to the plurality of cavities of the lower roller. This results in damaging the product in the blister pockets during the packaging operation. Currently, the alignment of the blister pockets with respect to the plurality of cavities is maintained by differentiating speeds of either the upper roller or the lower roller. Generally, both the upper roller and the lower roller have separate servo drives to drive the respective rollers. Therefore, there are limitations of reciprocation/synchronization of grippers in a direction of travel of the base foil at a higher speed.

Therefore, there is a need for an improved solution for maintaining alignment of the blister pockets with respect to the plurality of cavities of the lower roller in the blister packaging machine.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a rotary sealing apparatus for a blister packaging machine is disclosed. The rotary sealing apparatus includes a guide plate adapted to support a movement of a base foil having a plurality of blister pockets. Further, the rotary sealing apparatus includes a counter sealing roller adapted to tangentially receive the base foil from the guide plate and adapted to rotate to advance the base foil in a direction away from the guide plate. The counter sealing roller includes a plurality of cavities adapted to accommodate the plurality of blister pockets of the base foil. The rotary sealing apparatus includes a sealing roller adapted to feed a seal foil between the counter sealing roller and the sealing roller. The sealing roller is adapted to press against the counter sealing roller to seal the base foil with the seal foil. Further, the rotary sealing apparatus includes a cavity alignment unit disposed on the guide plate and adapted to align the plurality of blister pockets with the plurality of cavities. The cavity alignment unit is adapted to clamp the base foil on the guide plate to stretch the base foil to align the plurality of blister pockets with the plurality of cavities of the counter sealing roller.

In an embodiment of the present disclosure, a cavity alignment unit for a rotary sealing apparatus is disclosed. The rotary sealing apparatus includes a counter sealing roller with a plurality of cavities and a sealing roller. The cavity alignment unit includes an actuating unit adapted to clamp a base foil on a guide plate of the rotary sealing apparatus to stretch a portion of the base foil between the sealing roller and the counter sealing roller. The base foil includes a plurality of blister pockets adapted to accommodate within the plurality of cavities of the counter sealing roller. The cavity alignment unit includes a controlling unit in communication with the actuating unit. The controlling unit is configured to determine a position of each of the plurality of blister pockets with respect to the plurality of cavities on the counter sealing roller. The controlling unit is configured to operate the actuating unit to clamp the base foil based on the position of each of the plurality of blister pockets with respect to the plurality of cavities.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1A:
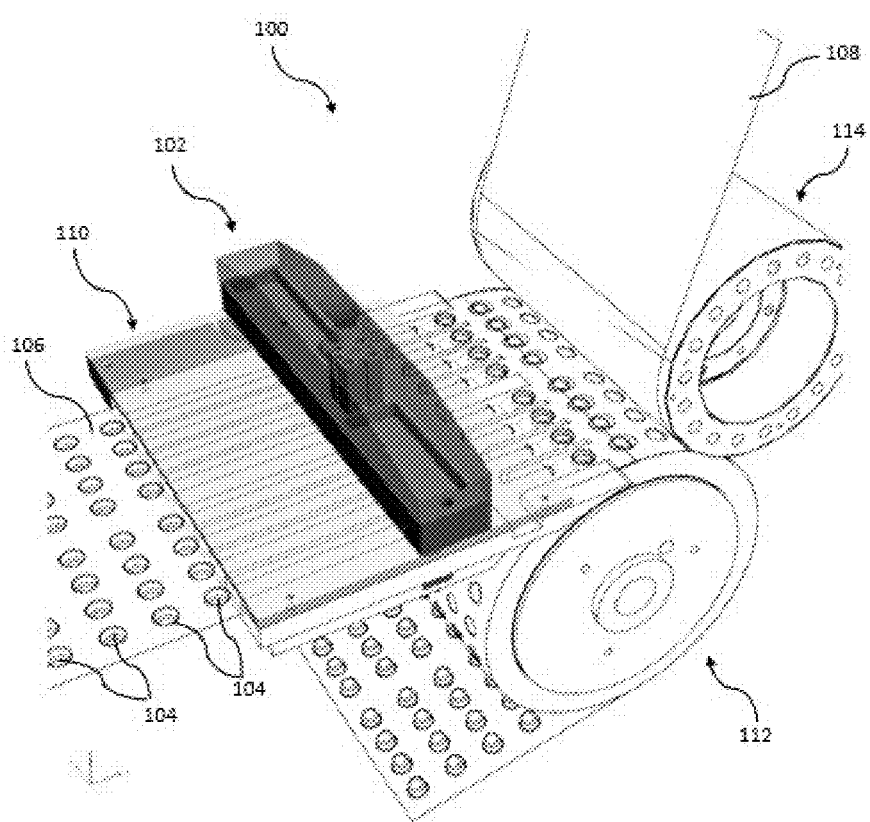
FIGS. 1a-1b illustrate different perspective views of a rotary sealing apparatus having a cavity alignment unit for a blister packaging machine, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

Figure 1B:
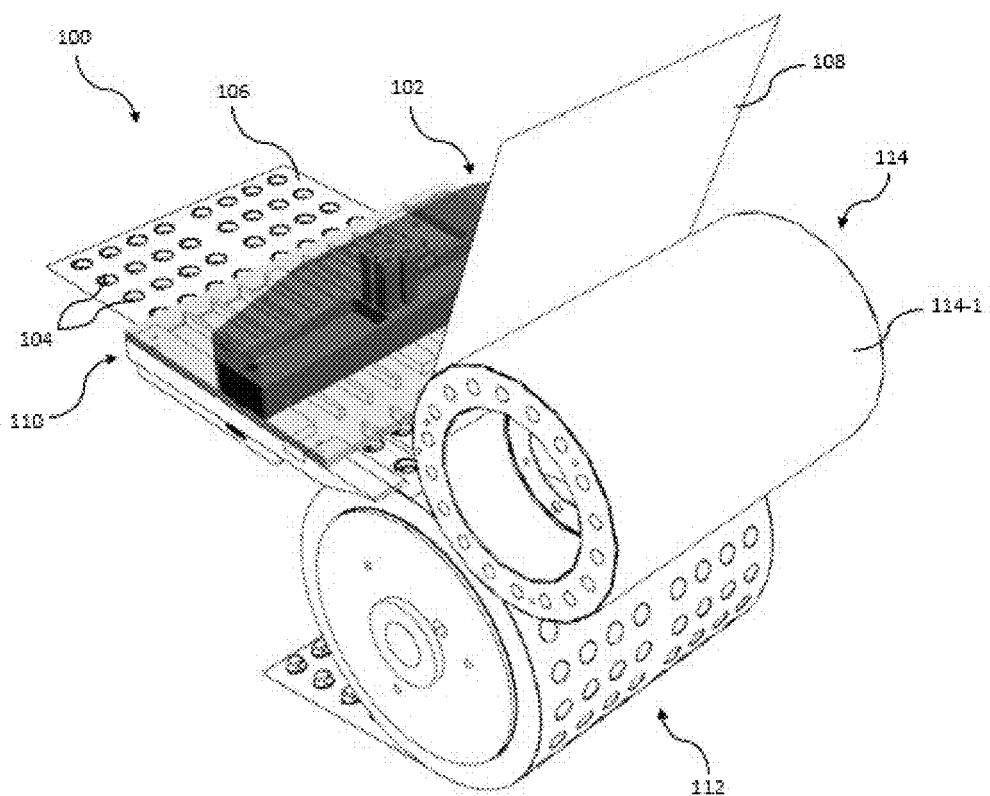

FIGS. 1a-1b illustrate different perspective views of a rotary sealing apparatus 100 having a cavity alignment unit 102 for a blister packaging machine, according to an embodiment of the present disclosure. In an embodiment, the blister packaging machine may interchangeably be referred to as the blister machine, without departing from the scope of the present disclosure. The blister machine may be employed for performing packaging operations in various applications including, but not limited to, small consumer goods, food products, and pharmaceutical products. For example, the blister machine may be employed for packaging tablets, capsules, and other similar pharmaceutical products.

The present disclosure is explained with respect to the blister machine employed for the packaging of various pharmaceutical products. However, it should be appreciated by a person skilled in the art that it should not be construed as limiting, and the present disclosure is equally applicable to the blister machine employed for packaging of other products, such as small commercial goods and food products, without departing from the scope of the present disclosure. The blister machine may be embodied as a thermo formed foil blister machine, without departing from the scope of the present disclosure.

Referring to FIG. 1a and FIG. 1b, the blister machine may include, but is not limited to a forming station (not shown), an automatic product feeding system (not shown), and the rotary sealing apparatus 100. The forming station of the blister machine may be adapted to form a plurality of blister pockets 104 on a base foil 106 for accommodating pharmaceutical products, such as tablets and capsules. The base foil 106 may be embodied as a cold forming film consists of multiple layers, such as PVC/Alu/Nylon, without departing from the scope of the present disclosure. In an embodiment, the plurality of blister pockets 104 may be formed on the base foil 106 by performing a cold-forming process using a plurality of Teflon plugs, without departing from the scope of the present disclosure.

Subsequently, the base foil 106 with the plurality of blister pockets 104 may be passed through the automatic product feeding system. In an embodiment, the automatic product feeding system may be adapted to supply products, such as tablets and capsules, to each of the plurality of blister pockets 104 of the base foil 106. Thereafter, the base foil 106 may be passed through the rotary sealing apparatus 100 of the blister machine for sealing the base foil 106 with a seal foil 108. In an embodiment, the rotary sealing apparatus 100 may be adapted to press the base foil 106 and the seal foil 108 together to seal the products accommodated within the plurality of blister pockets 104 of the base foil 106.

Further, the rotary sealing apparatus 100 may include a cavity alignment unit 102 for maintaining alignment of the plurality of blister pockets 104 of the base foil 106 with respect to the rotary sealing apparatus 100. In an embodiment, the cavity alignment unit 102 may be adapted to determine, in real-time, a position of the plurality of blister pockets 104 of the base foil 106 with respect to the rotary sealing apparatus 100. Further, based on the determined position, the cavity alignment unit 102 may correct the position of the plurality of blister pockets 104 with respect to the rotary sealing apparatus 100 to ensure proper sealing of the plurality of blister pockets 104 and, substantially eliminate any probable damage sustained to the plurality of blister pockets 104 due to misalignment. Constructional and operational details of the rotary sealing apparatus 100 and the cavity alignment unit 102 are explained in subsequent sections of the present disclosure.

Figure 2:
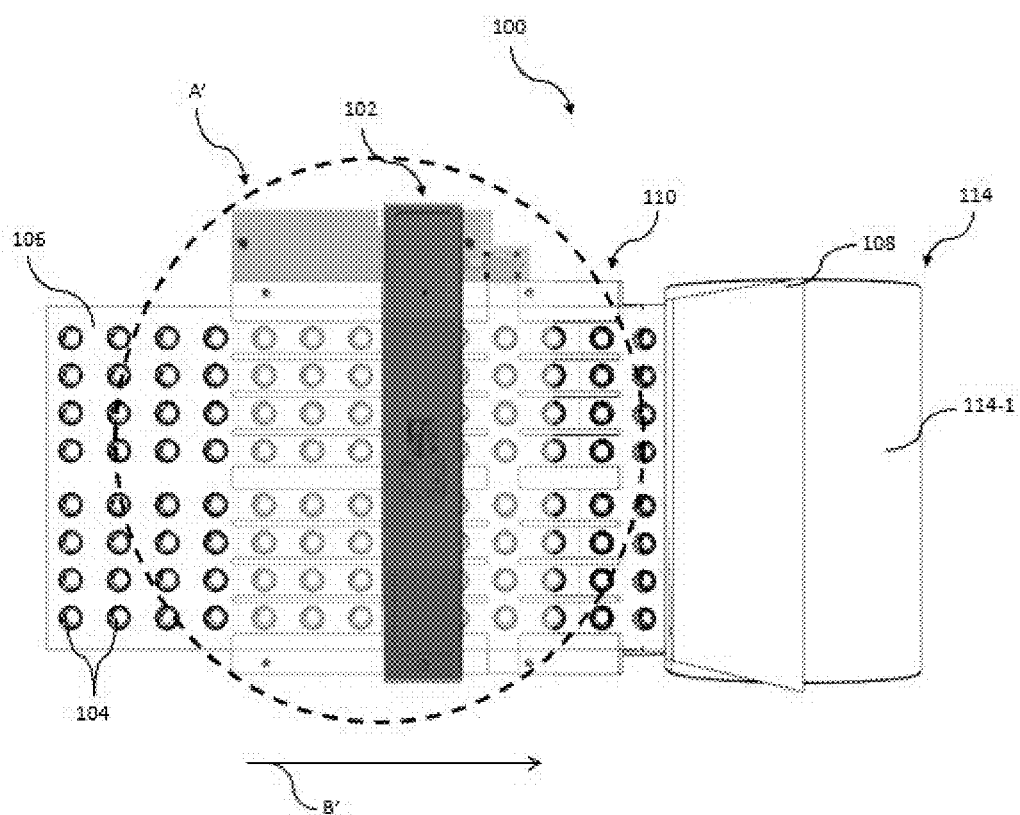
FIG. 2 illustrates a top view of the rotary sealing apparatus and the cavity alignment unit, according to an embodiment of the present disclosure.

FIG. 2 illustrates a top view of the rotary sealing apparatus 100 and the cavity alignment unit 102, according to an embodiment of the present disclosure. Referring to FIGS. 1a-1b and FIG. 2, the rotary sealing apparatus 100 may include, but is not limited to, a guide plate 110, a counter sealing roller 112, and a sealing roller 114. The guide plate 110 may be adapted to support a movement of the base foil 106 having the plurality of blister pockets 104 in the blister machine. The movement of the base foil 106 on the guide plate 110 may be indicated by an arrow B' in FIG. 2 of the present disclosure. The guide plate 110 may be adapted to feed the base foil 106 between the counter sealing roller 112 and the sealing roller 114 for sealing the plurality of blister pockets 104 of the base foil 106 with the seal foil 108.

Figure 3A:
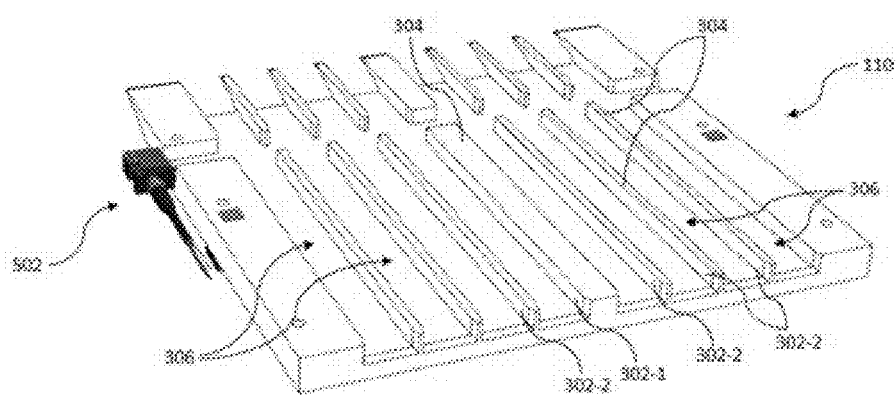
FIGS. 3a and 3b illustrate different perspective views of a guide plate of the rotary sealing apparatus, according to an embodiment of the present disclosure.
Figure 3B:
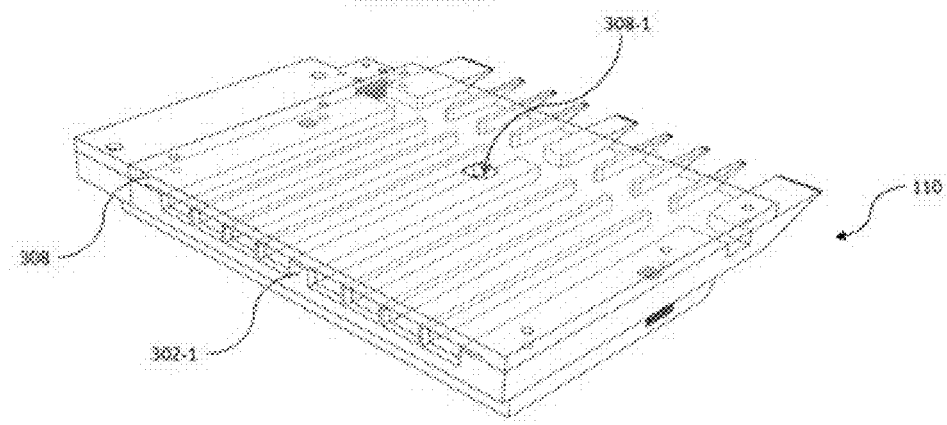

FIGS. 3a and 3b illustrate different perspective views of the guide plate 110 of the rotary sealing apparatus 100, according to an embodiment of the present disclosure. Referring to FIGS. 1a-1b, FIG. 2, FIG. 3a, and FIG. 3b, the guide plate 110 may include a plurality of guide tracks 302 distributed at equidistance from each other. In an embodiment, the plurality of guide tracks 302 may interchangeably be referred to as the guide tracks 302, without departing from the scope of the present disclosure. The guide tracks 302 may be adapted to guide the movement of the base foil 106 on the guide plate 110 towards the counter sealing roller 112 and the sealing roller 114. Each of the guide tracks 302 may include a contact surface 304 adapted to support the base foil 106 during operation of the blister machine.

Referring to FIG. 3a and FIG. 3b, the guide tracks 302 may include an intermediate track 302-1 and a plurality of auxiliary tracks 302-2. The intermediate track 302-1 may be disposed at a centre of the guide plate 110. The contact surface 304 of the intermediate track 302-1 may be wider than the contact surface 304 of the plurality of auxiliary tracks 302-2. The base foil 106 may be adapted to be clamped between the contact surface 304 of the intermediate track 302-1 of the guide plate 110 by the cavity alignment unit 102 in order to maintain alignment of the plurality of blister pockets 104 of the base foil 106 with respect to the counter sealing roller 112 of the rotary sealing apparatus 100.

Further, the guide plate 110 may include a plurality of channels 306 adapted to movably accommodate the plurality of blister pockets 104 of the base foil 106. In an embodiment, each of the plurality of channels 306 may be defined between a guide track and an adjacent guide track from among the plurality of guide tracks 302. In an embodiment, the plurality of channels 306 may individually be referred to as the channel 306, without departing from the scope of the present disclosure.

The channel 306 may be adapted to movably accommodate a row of the plurality of blister pockets 104 formed on the base foil 106. The row of the plurality of blister pockets 104 may be defined in a direction along the movement of the base foil 106 in the blister machine. The base foil 106 may travel over the guide tracks 302 of the guide plate 110 in a manner that the plurality of blister pockets 104 formed on the base foil 106 may move within the plurality of channels 306 defined between the guide tracks 302.

Further, in an embodiment, the guide plate 110 may be provided with a cover member 308 adapted to be disposed on the guide plate 110. The cover member 308 may be disposed on the guide plate 110 such that the base foil 106 may move on the guide plate 110 below the cover member 308. The cover member 308 may include an opening 308-1 adapted to allow clamping of the base foil 106 on the guide plate 110 by the cavity alignment unit 102 which is explained in the later section of the present disclosure. The cover member 308 may be disposed on the guide plate 110 such that the opening 308-1 may be aligned above the intermediate track 302-1 of the guide plate 110.

Figure 4:
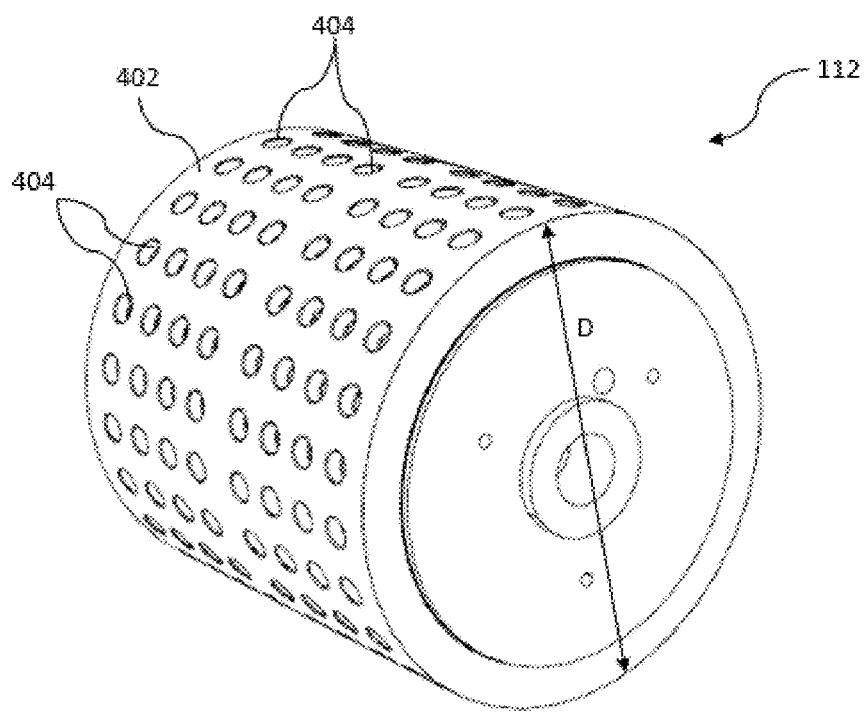
FIG. 4 illustrates a perspective view of a counter sealing roller of the rotary sealing apparatus, according to an embodiment of the present disclosure.

FIG. 4 illustrates a perspective view of the counter sealing roller 112 of the rotary sealing apparatus 100, according to an embodiment of the present disclosure. Referring to FIGS. 1a-1b, FIG. 2, and FIG. 4, the counter sealing roller 112 may be adapted to tangentially receive the base foil 106 from the guide plate 110. The counter sealing roller 112 may be embodied as a cylindrical roller, without departing from the scope of the present disclosure. The counter sealing roller 112 may be adapted to rotate to advance the base foil 106 in a direction away from the guide plate 110.

The counter sealing roller 112 may include an outer surface 402 provided with knurling to perform a mechanical knurling process on the base foil 106. Further, the counter sealing roller 112 may include a plurality of cavities 404 adapted to accommodate the plurality of blister pockets 104 of the base foil 106. In an embodiment, the plurality of cavities 404 may be circumferentially formed on the outer surface 402 of the counter sealing roller 112. Each of the plurality of cavities 404 may be distributed at equidistance from an adjacent cavity from among the plurality of cavities 404 on the counter sealing roller 112. The counter sealing roller 112 may be designed in a manner that during misalignment the plurality of cavities 404 may be on a leading side of the plurality of cavities 404 formed on the counter sealing roller 112 in a direction of the movement of the base foil 106.

In an embodiment, a circumference of the counter sealing roller 112 may greater than multiple Draw of Lengths (DOL) of the base foil 106 in the blister machine such that the plurality of blister pockets 104 misaligns with respect to the plurality of cavities 404 in a direction of the movement of the base foil 106. In such an embodiment, a diameter 'D' of the counter sealing roller 112 may be selected such that the circumference of the counter sealing roller 112 is greater than the multiple draw of lengths in the blister machine. Owing to misalignment of the plurality of blister pockets 104 in the direction of the movement of the base foil 106, the cavity alignment unit 102 may be required to momentarily clamp the base foil 106 on the guide plate 110 to move the plurality of blister pockets 104 in a direction opposite to the movement of the base foil 106, which is explained in detail in the subsequent sections of the present disclosure.

As mentioned earlier, the rotary sealing apparatus 100 may include the sealing roller 114 juxtaposed with the counter sealing roller 112 of the rotary sealing apparatus 100. An outer surface 114-1 of the sealing roller 114 may be provided to perform the mechanical knurling process on the seal foil 108. The sealing roller 114 may be adapted to feed the seal foil 108 between the counter sealing roller 112 and the sealing roller 114. The sealing roller 114 may be adapted to press against the counter sealing roller 112 to seal the base foil 106 with the seal foil 108.

In an embodiment, the rotary sealing apparatus 100 may include a pneumatic system (not shown) having a cylinder adapted to push the sealing roller 114 against the counter sealing roller 112 for sealing the base foil 106 with the seal foil 108. The sealing roller 114 may be heated at a predefined temperature and pressed against the counter sealing roller 112 such that base foil 106 may be sealed with the seal foil 108 between the counter sealing roller 112 and the sealing roller 114. Owing to the heat generated between the sealing roller 114 and the counter sealing roller 112, the base foil 106 may be sealed with the seal foil 108.

In an embodiment, the rotary sealing apparatus 100 may include a first drive adapted to rotate the counter sealing roller 112 and a second drive adapted to rotate the sealing roller 114. The first drive and the second drive may rotate the counter sealing roller 112 and the sealing roller 114, respectively, in synchronization with respect to each other. In an embodiment, the first drive may be embodied as a servo drive, without departing from the scope of the present disclosure. Further, the second drive may be embodied as one of a servo drive and a mechanical drive.

Figure 5:
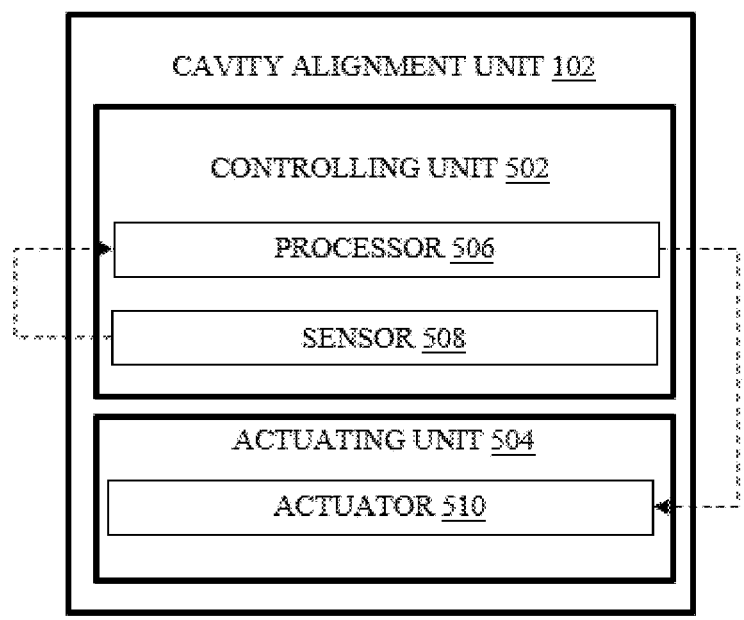
FIG. 5 illustrates a schematic view of the cavity alignment unit, according to an embodiment of the present disclosure.

FIG. 5 illustrates a schematic view of the cavity position correction unit, according to an embodiment of the present disclosure. As explained earlier, the rotary sealing apparatus 100 may include the cavity alignment unit 102 adapted to maintain alignment of the plurality of blister pockets 104 of the base foil 106 with respect to the plurality of cavities 404 formed on the counter sealing roller 112. The cavity alignment unit 102 may be disposed on the guide plate 110 and adapted to align the plurality of blister pockets 104 with the plurality of cavities 404. The cavity alignment unit 102 may be adapted to clamp the base foil 106 on the guide plate 110 to stretch the base foil 106 to align the plurality of blister pockets 104 with the plurality of cavities 404 of the counter sealing roller 112.

Referring to FIG. 5, in the illustrated embodiment, the cavity alignment unit 102 may include a housing member 602 (shown in FIG. 6) extending along a width of the guide plate 110. The housing member 602 may be adapted to cover various sub-components of the cavity alignment unit 102. The housing member 602 may be adapted to be supported on the cover member 308 disposed on the guide plate 110. In an embodiment, the cavity alignment unit 102 may include, but is not limited to, a controlling unit 502 and an actuating unit 504 in communication with the controlling unit 502.

The controlling unit 502 may be configured to determine the position of each of the plurality of blister pockets 104 with respect to the plurality of cavities 404 on the counter sealing roller 112. Further, the controlling unit 502 may be configured to operate the actuating unit 504 to clamp the base foil 106 based on the position of each of the plurality of blister pockets 104 with respect to the plurality of cavities 404.

Referring to FIG. 5, in the illustrated embodiment, the controlling unit 502 may include, but is not limited to, a processor 506, a sensor 508 in communication with the processor 506, memory, module(s), and data. The module(s) and the memory are coupled to the processor 506. The processor 506 can be a single processing unit or a number of units, all of which could include multiple computing units. The processor 506 may be implemented as one or more microprocessors, microcomputers, microcontrollers, digital signal processors, central processing units, state machines, logic circuitries, and/or any devices that manipulate signals based on operational instructions. Among other capabilities, the processor 506 is configured to fetch and execute computer-readable instructions and data stored in the memory.

The memory may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The module(s), amongst other things, include routines, programs, objects, components, data structures, etc., which perform particular tasks or implement data types. The module(s) may also be implemented as, signal processor(s), state machine(s), logic circuitries, and/or any other device or component that manipulate signals based on operational instructions. Further, the module(s) may be implemented in hardware, instructions executed by at least one processing unit, for e.g., the processor, or by a combination thereof. The processing unit may comprise a computer, a processor, a state machine, a logic array and/or any other suitable devices capable of processing instructions. The processing unit may be a general-purpose processor which executes instructions to cause the general-purpose processor to perform operations or, the processing unit may be dedicated to perform the required functions. In some example embodiments, the module(s) 206 may be machine-readable instructions (software, such as web-application, mobile application, program, etc.) which, when executed by a processor/processing unit, perform any of the described functionalities.

The sensor 508 may be embodied as a distance sensor. In an example, the sensor 508 may be embodied as a photo-electric diffuse-type sensor having a pulsed red laser diode adapted to generate a red laser beam, without departing from the scope of the present disclosure. Referring to FIG. 3a, the sensor 508 and the processor 506 may be adapted to be positioned adjacent to the guide plate 110. However, it should be appreciated by a person skilled in the art that it should not be construed as limiting, and the processor 506 of the cavity alignment unit 102 can be positioned at different location on the blister machine, without departing from the scope of the present disclosure.

The sensor 508 may be adapted to determine, in real-time, a value indicative of the position of the plurality of blister pockets 104 with respect to the plurality of cavities 404. The sensor 508 may be in communication with the processor 506 to transmit the value indicative of the position of the plurality of blister pockets 104 with respect to the plurality of cavities 404. The processor 506 may be configured to receive the value indicative of the position of the plurality of blister pockets 104 with respect to the plurality of cavities 404 from the sensor 508.

In an embodiment, the processor 506 may be configured to compare the received value with a threshold value indicative of a position of the plurality of blister pockets 104 with respect to the plurality of cavities 404 of the counter sealing roller 112. The processor 506 may be configured to be in communication with the actuating unit 504 of the cavity alignment unit 102. The processor 506 may be configured to operate the actuating unit 504 to clamp the base foil 106 on the guide plate 110, if the received value is different from the threshold value indicative of the position of the plurality of blister pockets 104 with respect to the plurality of cavities 404.

Figure 6:
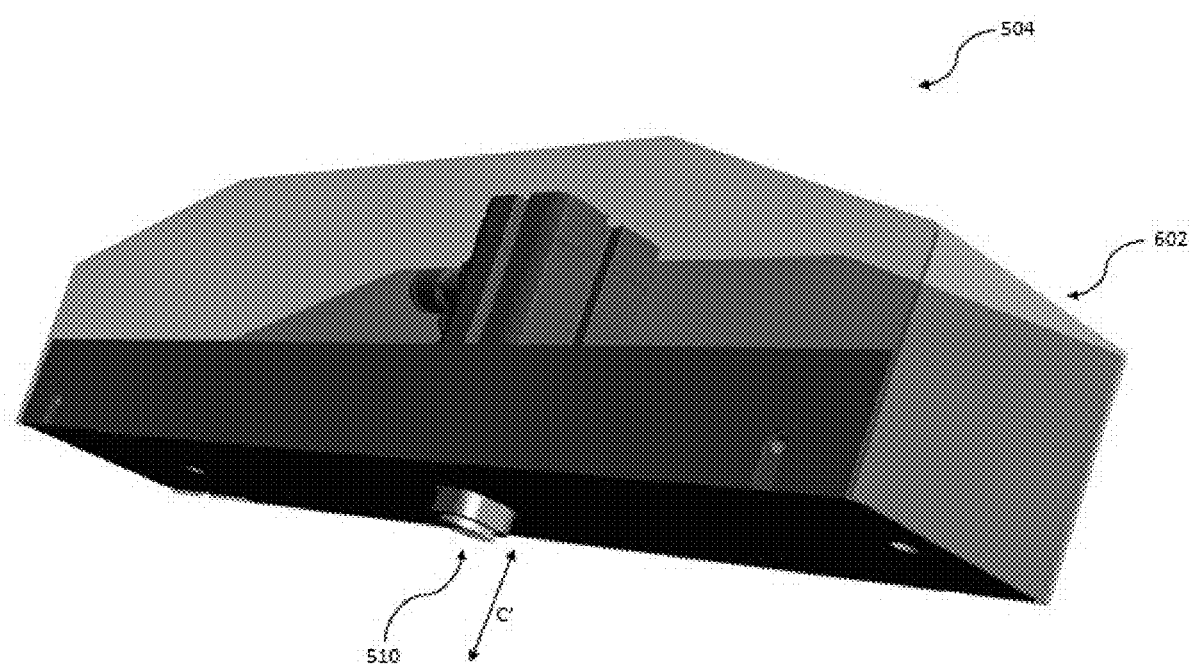
FIG. 6 illustrates a perspective view of an actuating unit of the cavity alignment unit, according to an embodiment of the present disclosure.

FIG. 6 illustrates a perspective view of the actuating unit 504 of the cavity alignment unit 102, according to an embodiment of the present disclosure. Referring to FIG. 5 and FIG. 6, the housing member 602 may be adapted to cover the actuating unit 504 on the guide plate 110. In the illustrated embodiment, the housing member 602 may be adapted to cover the actuating unit 504 on the cover member 308 disposed on the guide plate 110. The actuating unit 504 may be adapted to clamp the base foil 106 on the guide plate 110 to stretch a portion of the base foil 106 between the sealing roller 114 and the counter sealing roller 112.

In an embodiment, the actuating unit 504 may include an actuator 510 adapted to clamp the base foil 106 and in communication with the processor 506 of the controlling unit 502. The actuator 510 may be embodied as one of a pneumatic actuator, a hydraulic actuator, and an electric actuator, without departing from the scope of the present disclosure. The actuator 510 may be adapted to move in a direction towards the base foil 106 on the guide plate 110. A direction of the movement of the actuator 510 is indicated by an arrow C' in FIG. 6.

The actuator 510 may be adapted to be operated in an extended position and a retracted position, without departing from the scope of the present disclosure. The actuator 510 may be adapted to clamp the base foil 106 on the guide plate 110 to stretch the base foil 106 such that the each of the plurality of blister pockets 104 accommodates within each of the plurality of cavities 404 of the counter sealing roller 112. In the illustrated embodiment, the actuating unit 504 may be adapted to be positioned on the cover member 308 which is disposed on the guide plate 110.

As mentioned earlier, the cover member 308 may include the opening 308-1 adapted to movably receive the actuator 510 of the actuating unit 504. In particular, the actuator 510 may be adapted to move through the opening 308-1 of the cover member 308 to clamp the base foil 106 on the contact surface 304 of the intermediate track 302-1 of the guide plate 110. In particular. when the actuator 510 is operated to the extended position by the processor 506, the actuator 510 may move through the opening 308-1 of the cover member 308 to clamp the base foil 106.

The actuator 510 may clamp the base foil 106 against the intermediate track 302-1 to apply momentary brakes to the movement of the base foil 106 on the guide track 202. Owing to such braking effect, the portion of the base foil 106 between the sealing roller 114 and the counter sealing roller 112 may be stretched to align the plurality of blister pockets 104 of the base foil 106 with the plurality of cavities 404 of the counter sealing roller 112. In particular, when the actuator 510 is operated to the extended position, the portion of the base foil 106 may be stretched owing to the braking effect and due to heat generated between the sealing roller 114 and the counter sealing roller 112.

Figure 7:
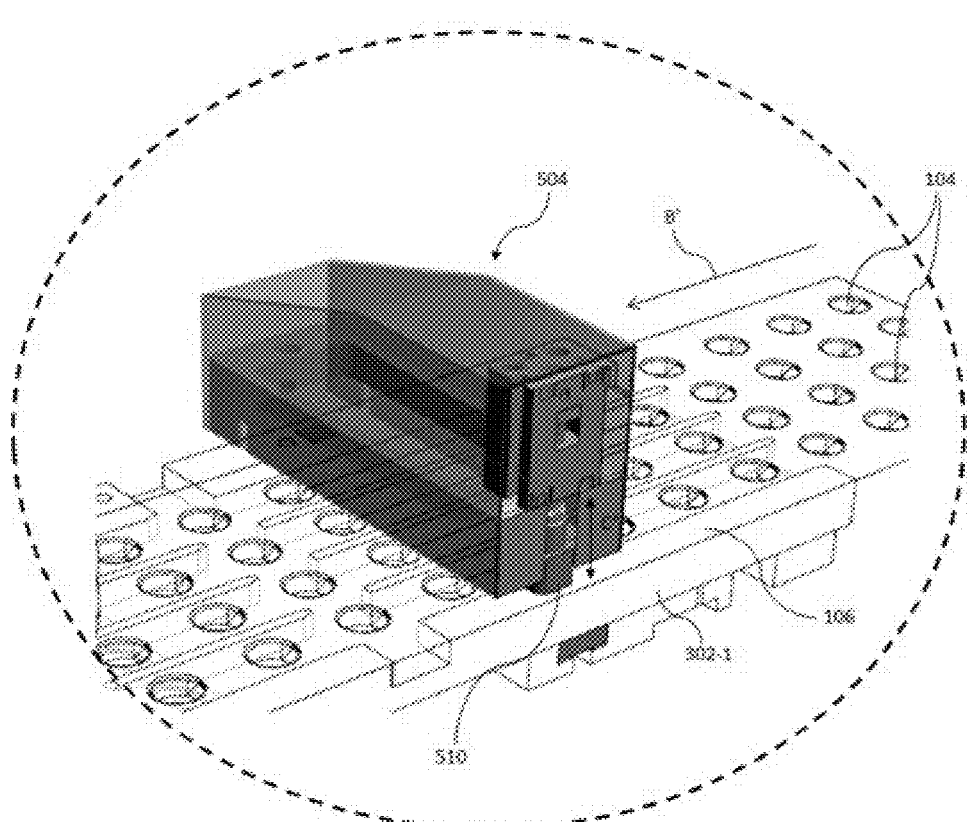
FIG. 7 illustrates a partial sectional view of a portion A' of FIG. 2 depicting the actuating unit of the cavity alignment unit, according to an embodiment of the present disclosure.

FIG. 7 illustrates a partial sectional view of a portion A' of FIG. 2 depicting the actuating unit 504 of the cavity alignment unit 102, according to an embodiment of the present disclosure. During the operation of the blister machine, the sensor 508 of the controlling unit 502 determine the value of the position of the plurality of blister pockets 104 with respect to the plurality of cavities 404. Subsequently, the sensor 508 may transmit the determined value to the processor 506 of the controlling unit 502. The processor 506 may compare the determined value of the position with the threshold value of the position. If the determined value of the position is similar to the threshold value of the position, then the actuator 510 may remain in the retracted position.

Referring to FIG. 7, if the determined value of the position is different from the threshold value of the position, then the processor 506 may operate the actuator 510 to the extended position. In the extended position, the actuator 510 may clamp the base foil 106 against the intermediate track 302-1 of the guide plate 110 to apply a braking effect on the movement of the base foil 106. Owing to such braking effect and heat generated between the sealing roller 114 and the counter sealing roller 112, the portion of the base foil 106 between the sealing roller 114 and the counter sealing roller 112 may be stretched to move the plurality of blister pockets 104 in the direction opposite to the movement of the base foil 106. This results in the alignment of the plurality of blister pockets 104 with the plurality of cavities 404 of the counter sealing roller 112.

Subsequently, the sensor 508 may determine the value of the position of the plurality of blister pockets 104 and the plurality of cavities 404 after clamping of the base foil 106 on the guide plate 110 by the actuator 510. If the value of the position is similar to the threshold value of the position, then the processor 506 may operate the actuator 510 to the retracted position. In the retracted position, the braking effect on the movement of the base foil 106 is eliminated and the base foil 106 may move on the guide track 110 towards the counter sealing roller 112 and the sealing roller 114.

As would be gathered, the present disclosure offers the rotary sealing apparatus 100 and the cavity alignment unit 102 for the blister machine. The cavity alignment unit 102 includes the controlling unit 502 and the actuating unit 504 in communication with the controlling unit 502. The controlling unit 502 includes the processor 506 and the sensor 508 adapted to determine the alignment between the plurality of blister pockets 104 and the plurality of cavities 404 of the counter sealing roller 112. Based on the determined alignment, the processor 506 may operate the actuator 510 of the actuating unit 504 to clamp the base foil 106 on the guide plate 110 to provide the braking effect to the movement of the base foil 106. This results in stretching of the portion of the base foil 106 between the counter sealing roller 112 and the sealing roller 114.

Owing to stretching of the portion of the base foil 106, the plurality of blister pockets 104 moves in the direction opposite to the movement of the base foil 106 to align the plurality of blister pockets 104 with the plurality of cavities 404. Therefore, the cavity alignment unit 102 of the present disclosure eliminates the requirement of regulating speeds of the counter sealing roller 112 and the sealing roller 114 for maintaining the alignment of the plurality of blister pockets 104 and the plurality of cavities 404. Therefore, the cavity alignment unit 102 and the rotary sealing apparatus 100 of the present disclosure are efficient, durable, flexible in implementation, cost-effective, convenient, and can be employed for a wide range of packaging applications.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A rotary sealing apparatus (100) for a blister packaging machine, the rotary sealing apparatus (100) comprising:
    a guide plate (110) adapted to support a movement of a base foil (106) having a plurality of blister pockets (104);
    a counter sealing roller (112) adapted to tangentially receive the base foil (106) from the guide plate (110) and adapted to rotate to advance the base foil (106) in a direction away from the guide plate (110), wherein the counter sealing roller (112) includes a plurality of cavities (404) adapted to accommodate the plurality of blister pockets (104) of the base foil (106);
    a sealing roller (114) adapted to feed a seal foil (108) between the counter sealing roller (112) and the sealing roller (114), wherein the sealing roller (114) is adapted to press against the counter sealing roller (112) to seal the base foil (106) with the seal foil (108); and
    a cavity alignment unit (102) disposed on the guide plate (110) and adapted to align the plurality of blister pockets (104) with the plurality of cavities (404), wherein the cavity alignment unit (102) is adapted to clamp the base foil (106) on the guide plate (110) to stretch the base foil (106) to align the plurality of blister pockets (104) with the plurality of cavities (404) of the counter sealing roller (112).

2. The rotary sealing apparatus (100) as claimed in claim 1, wherein the cavity alignment unit (102) comprising:
    an actuating unit (504) adapted to clamp the base foil (106) on the guide plate (110) to stretch a portion of the base foil (106) between the sealing roller (114) and the counter sealing roller (112);
    a controlling unit (502) in communication with the actuating unit (504) and configured to:
        determine a position of each of the plurality of blister pockets (104) with respect to the plurality of cavities (404) formed on the counter sealing roller (112); and
        operate the actuating unit (504) to clamp the base foil (106) based on the position of each of the plurality of blister pockets (104) with respect to the plurality of cavities (404).

3. The rotary sealing apparatus (100) as claimed in claim 2, wherein the controlling unit (502) includes a processor (506) and a sensor (508) in communication with the processor (506), the processor (506) is configured to:
    receive a value indicative of the position of the plurality of blister pockets (104) with respect to the plurality of cavities (404) of the counter sealing roller (112) from the sensor (508);
    compare the received value with a threshold value indicative of a position of the plurality of blister pockets (104) with respect to the plurality of cavities (404) of the counter sealing roller (112); and
    operate the actuating unit (504) to clamp the base foil (106) on the guide plate (110), if the received value is different from the threshold value indicative of the position.

4. The rotary sealing apparatus (100) as claimed in claim 3, wherein the sensor (508) is a distance sensor (508) positioned adjacent to the guide plate (110) and adapted to determine the value indicative of the position of the plurality of blister pockets (104) with respect to the plurality of cavities (404).

5. The rotary sealing apparatus (100) as claimed in claim 2, wherein the actuating unit (504) includes an actuator adapted to clamp the base foil (106), the actuator is adapted to move in a direction towards the base foil (106) moving on the guide plate (110).

6. The rotary sealing apparatus (100) as claimed in claim 2, wherein the cavity alignment unit (102) includes a housing member (602) extending along a width of the guide plate (110), the housing member (602) is adapted to cover the actuating unit (504) on the guide plate (110).

7. The rotary sealing apparatus (100) as claimed in claim 1 further comprising a first drive adapted to rotate the counter sealing roller (112) and a second drive adapted to rotate the sealing roller (114).

8. The rotary sealing apparatus (100) as claimed in claim 1, wherein the first drive and the second drive rotate the counter sealing roller (112) and the sealing roller (114), respectively, in synchronization with respect to each other.

9. The rotary sealing apparatus (100) as claimed in claim 1, wherein a circumference of the counter sealing roller (112) is greater than multiple draw of lengths of the base foil (106) in the blister packaging machine such that the plurality of blister pockets (104) misaligns with respect to the plurality of cavities (404) in a direction of the movement of the base foil (106).

10. The rotary sealing apparatus (100) as claimed in claim 2, wherein the actuating unit (504) is adapted to clamp the base foil (106) on the guide plate (110) to stretch the base foil (106) such that the each of the plurality of blister pockets (104) accommodates within each of the plurality of cavities (404) of the counter sealing roller (112).

11. The rotary sealing apparatus (100) as claimed in claim 1, wherein the plurality of blister pockets (104) are formed in the base foil (106) by a cold-forming process.

12. A cavity alignment unit (102) for a rotary sealing apparatus (100) having a counter sealing roller (112) with a plurality of cavities (404) and a sealing roller (114), the cavity alignment unit (102) comprising:
- an actuating unit (504) adapted to clamp a base foil (106) on a guide plate (110) of the rotary sealing apparatus (100) to stretch a portion of the base foil (106) between the sealing roller (114) and the counter sealing roller (112), wherein the base foil (106) includes a plurality of blister pockets (104) adapted to accommodate within the plurality of cavities (404) of the counter sealing roller (112);
- a controlling unit (502) in communication with the actuating unit (504) and configured to:
  - determine a position of each of the plurality of blister pockets (104) with respect to the plurality of cavities (404) formed on the counter sealing roller (112); and
  - operate the actuating unit (504) to clamp the base foil (106) based on the position of each of the plurality of blister pockets (104) with respect to the plurality of cavities (404).

13. The cavity alignment unit (102) as claimed in claim 12, wherein the controlling unit (502) includes a processor (506) and a sensor (508) in communication with the processor (506), the processor (506) is configured to:
- receive a value indicative of the position of the plurality of blister pockets (104) with respect to the plurality of cavities (404) of the counter sealing roller (112) from the sensor (508);
- compare the received value with a threshold value indicative of a position of the plurality of blister pockets (104) with respect to the plurality of cavities (404) of the counter sealing roller (112); and
- operate the actuating unit (504) to clamp the base foil (106) on the guide plate (110), if the received value is different from the threshold value indicative of the position.

14. The cavity alignment unit (102) as claimed in claim 12, wherein the actuating unit (504) includes an actuator adapted to move in a direction towards the base foil (106) moving on the guide plate (110).

15. The cavity alignment unit (102) as claimed in claim 12, wherein the cavity alignment unit (102) includes a housing member (602) extending along a width of the guide plate (110), the housing member (602) is adapted to cover the actuating unit (504) on the guide plate (110).

16. The cavity alignment unit (102) as claimed in claim 12, wherein the actuating unit (504) is adapted to clamp the base foil (106) on the guide plate (110) to stretch the base foil (106) such that the each of the plurality of blister pockets (104) accommodates within each of the plurality of cavities (404) of the counter sealing roller (112).

17. The cavity alignment unit (102) of claim 12, wherein the rotary sealing apparatus (100) comprises a first drive adapted to rotate the counter sealing roller (112) and a second drive adapted to rotate the sealing roller (114).

18. The cavity alignment unit (102) of claim 17, wherein the first drive and the second drive rotate the counter sealing roller (112) and the sealing roller (114), respectively, in synchronization with respect to each other.

19. The cavity alignment unit (102) of claim 18, wherein a circumference of the counter sealing roller (112) is greater than multiple draw of lengths of the base foil (106).

20. The cavity alignment unit (102) of claim 19, wherein the plurality of blister pockets (104) misaligns with respect to the plurality of cavities (404) in a direction of the movement of the base foil (106).

\* \* \* \* \*